US009002111B2

(12) United States Patent
Bodin et al.

(10) Patent No.: US 9,002,111 B2
(45) Date of Patent: Apr. 7, 2015

(54) DETERMINING SCALING FACTORS FOR DEVICES

(75) Inventors: William Bodin, Austin, TX (US);
Indiver N. Dwivedi, Pune (IN); David Jaramillo, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 13/447,709

(22) Filed: Apr. 16, 2012

(65) Prior Publication Data

US 2013/0272613 A1    Oct. 17, 2013

(51) Int. Cl.
*G06K 9/18* (2006.01)
*G06T 3/40* (2006.01)

(52) U.S. Cl.
CPC .......................................... *G06T 3/40* (2013.01)

(58) Field of Classification Search
CPC ............ G06K 9/18; G06K 9/186; H04N 7/50
USPC ................... 382/182, 298, 186, 232
See application file for complete search history.

(56) References Cited

U.S. PATENT DOCUMENTS

| | | | |
|---|---|---|---|
| 5,896,470 A * | 4/1999 | Miyaza | 382/298 |
| 2002/0062396 A1* | 5/2002 | Kakei et al. | 709/246 |
| 2003/0014445 A1 | 1/2003 | Formanek et al. | |
| 2010/0124939 A1 | 5/2010 | Osborne et al. | |
| 2011/0202832 A1 | 8/2011 | Lum | |
| 2011/0231746 A1 | 9/2011 | Rohrabaugh et al. | |

* cited by examiner

*Primary Examiner* — Ruiping Li
(74) *Attorney, Agent, or Firm* — Cantor Colburn LLP

(57) ABSTRACT

An image scaling service includes determining an image as a candidate for a scaling process, scanning the image for an initial text value, and scaling the image to a next lower resolution. The image scaling service also includes iteratively performing the scaling process until a threshold value of a readability metric is reached, the scaling process includes scanning the scaled image for a scaled text value, comparing a difference between the initial text value and the scaled text value, the difference indicative of the readability metric, and scaling the scaled image to a next lower resolution. In response to reaching the threshold value of the readability metric, the image scaling service further includes selecting from scaled images an image having a lowest resolution resulting from the scaling process before the threshold value of the readability metric was reached.

4 Claims, 6 Drawing Sheets

DETERMINING SCALING FACTORS FOR DEVICES

BACKGROUND

The present invention relates to web services and, more specifically, to determining scaling factors for rendering digital media on devices.

There are numerous small screen-based mobile devices on the market, such as smartphones, tablet PCs, personal digital assistants, etc., that are used to access network-based digital content or run applications. Sources of digital content inherently utilize images for their user interfaces. Many times, these images are transformed into various file formats in order to be successfully rendered across various mobile devices, operating systems, and web browsers. In some instances, images are reduced in order to fit within a smaller screen; however, the text contained in these reduced images can become distorted or unreadable during this process.

SUMMARY

According to another embodiment of the present invention, a system for image scaling is provided. The system includes a computer processor and logic executable by the computer processor. The logic is configured to implement a method. The method includes determining an image as a candidate for a scaling process, scanning the image and identifying text in the image from the scanning, and scaling the image to a next lower resolution. The method also includes iteratively performing the scaling process until a threshold value of a readability metric is reached. The scaling process includes scanning the scaled image for scaled text, comparing a difference between the text and the scaled text, the difference indicative of the readability metric, and scaling the scaled image to a next lower resolution. In response to reaching the threshold value of the readability metric, the method includes selecting from scaled images an image having a lowest resolution resulting from the scaling process before the threshold value of the readability metric was reached.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
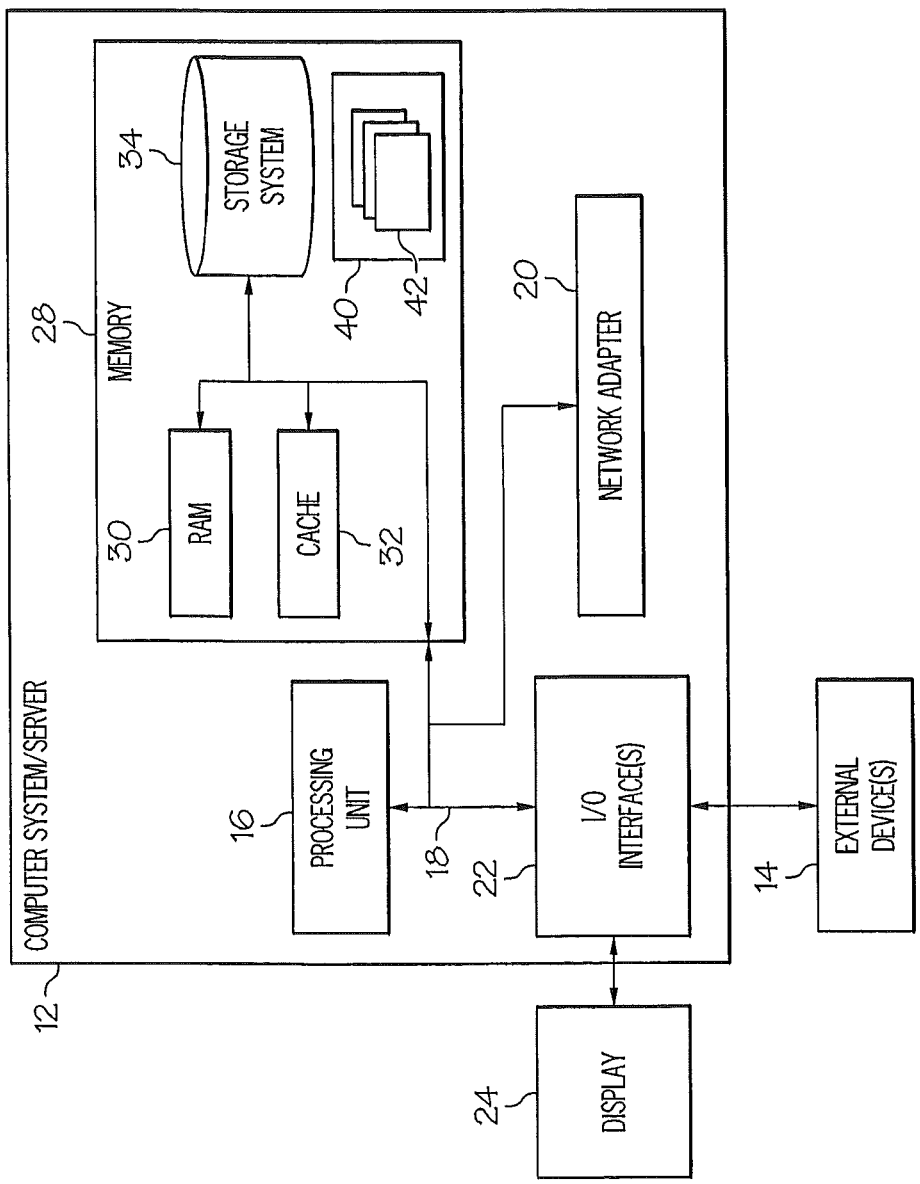
FIG. 1 depicts a cloud computing node according to an embodiment of the present invention.

Exemplary embodiments relate to image conversion and scaling services, which provide the ability to evaluate digital media, such as images for requested content, such as web pages and determine a scalability factor for reducing the size of the digital media to a level that ensures readability of any text (e.g., text embedded in an image).

It is understood in advance that although this disclosure includes a detailed description on cloud computing, implementation of the teachings recited herein are not limited to a cloud computing environment. Rather, embodiments are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
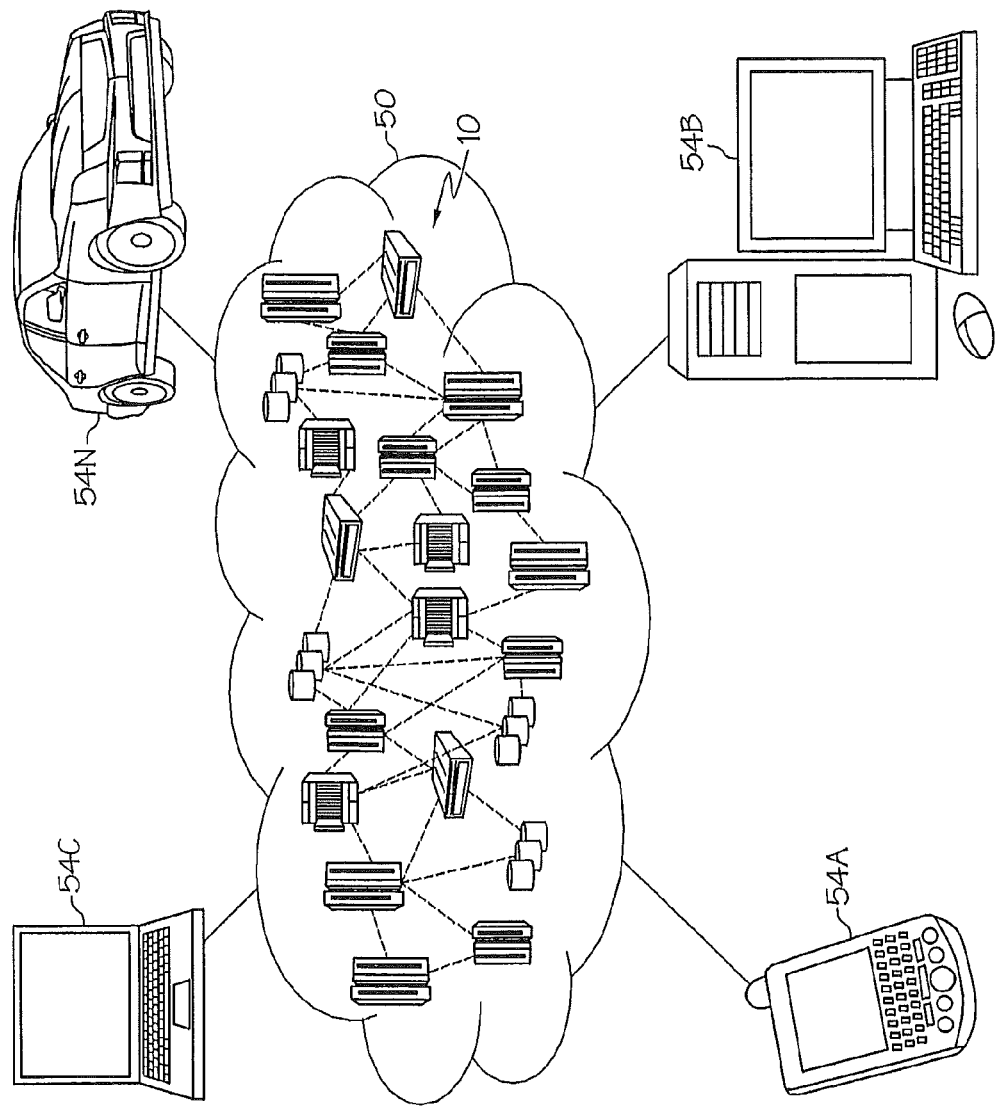
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
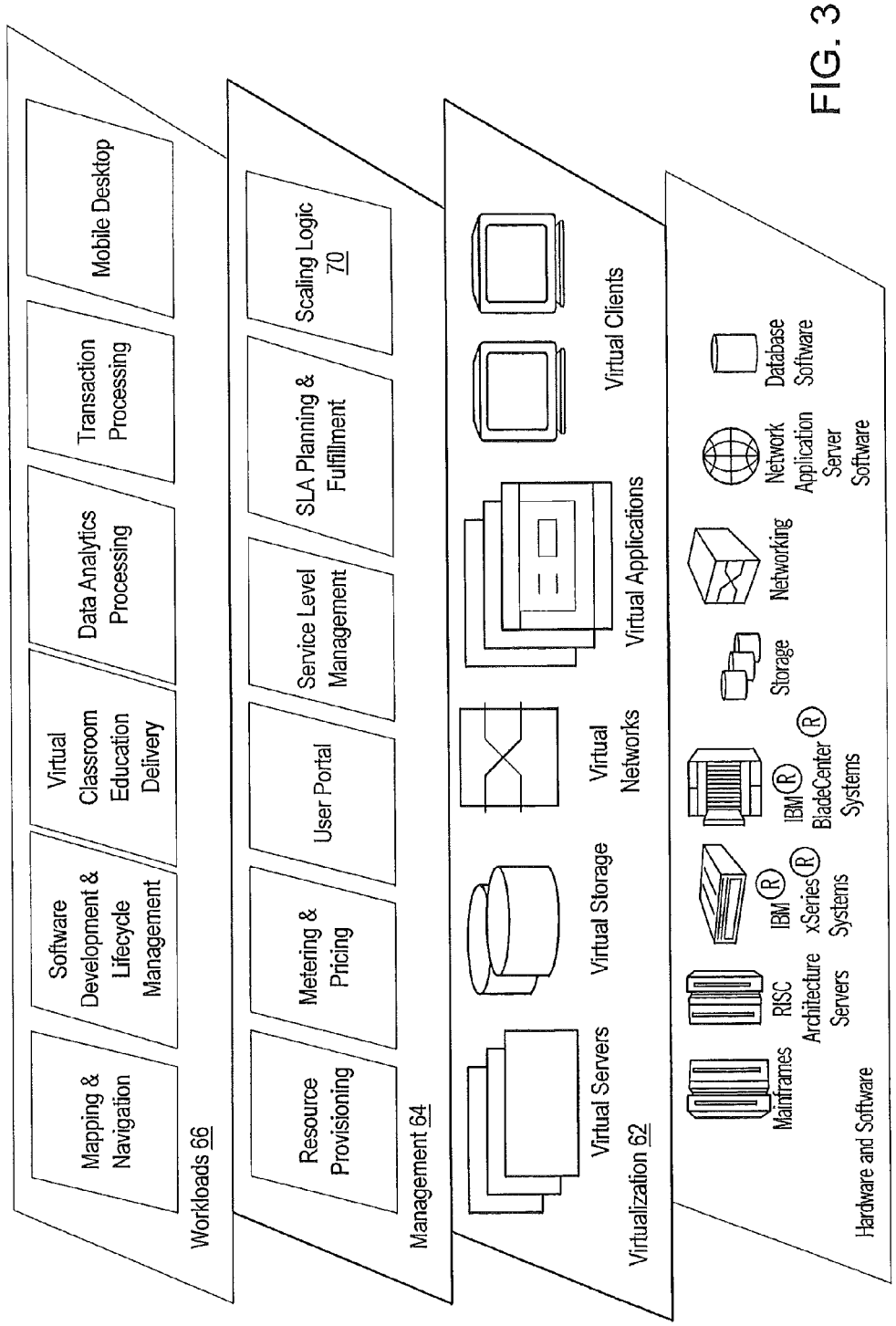
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In one exemplary embodiment, scaling logic 70 in the management layer 64 implements the exemplary image conversion and scaling processes described herein; however, it will be understood that the scaling logic 70 may be implemented in any layer.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The scaling logic 70 includes one or more algorithms to implement embodiments described herein to provide image conversion and scaling services. In an embodiment, the scaling logic 70 is coupled to and/or resides in the memory 28 shown in FIG. 1. In addition, embodiments of the scaling logic 70 include one or more program modules 42 of the program/utility 40 shown in FIG. 1. In a further embodiment, the scaling logic 70 is part of the management layer 64 and is executed on hardware located in the hardware and software layer 60.

The exemplary image conversion and scaling services provide the ability to evaluate digital media, such as images for requested content, such as web pages and determine a scalability factor for reducing the size of the digital media to a level that maintains readability of any text (e.g., text embedded in an image file).

Figure 4:
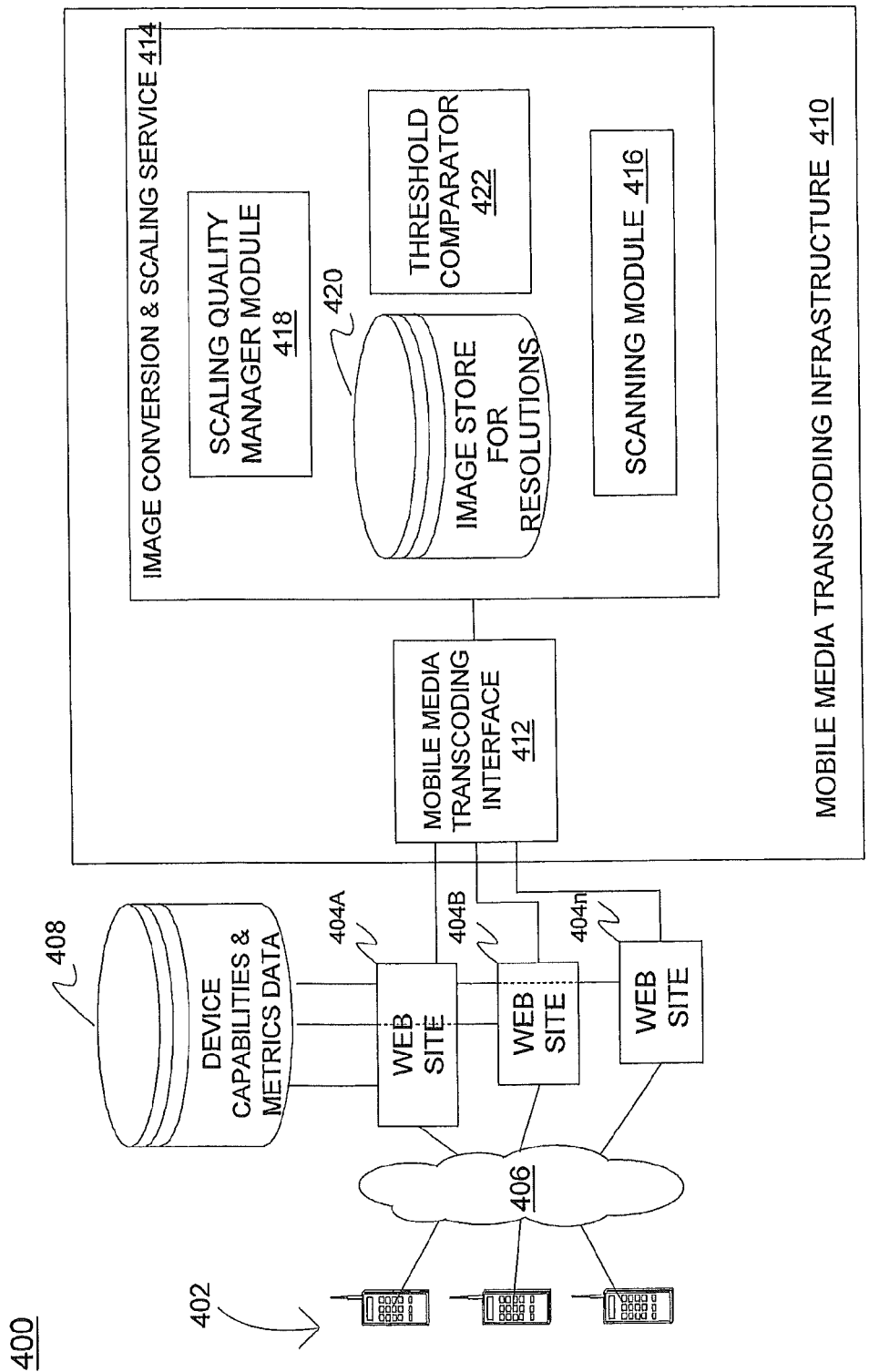
FIG. 4 depicts a block diagram of a system upon which scaling services may be implemented according to an embodiment of the present invention.

Turning now to FIG. 4, a system 400 upon which the image conversion and scaling services may be implemented will now be described. The system 400 of FIG. 4 depicts mobile devices 402 in communicatively coupled to websites 404A-404n over one or more networks 406. The mobile devices 402 may be any type of web-enabled, portable communications device, such as a smart phone, personal digital assistant, or tablet computer. The mobile devices 402 may each correspond to a cloud computing node 10 of FIG. 1 or one or more of the corresponding cloud consumers 54 shown in FIG. 2. The mobile devices 402 may each operate a web browser (not shown) for accessing one or more websites 404A-404n of FIG. 4. In one embodiment, the mobile devices 402 contact the websites 404 and implement transactions, such as requesting web pages from the websites 404.

The networks 406 may include a cloud computing network (e.g., the network 50 of FIG. 2) that offers virtual computing services to end users. The storage device 408 stores device capabilities and metrics data used by the exemplary image conversion and scaling services. For example, different devices may be capable of receiving files presented in certain file formats, e.g., JPEG or TIFF, and devices having smaller screen sizes may not be capable of viewing all of the content offered on a particular web page. The storage device 408 may store each of various mobile device capabilities.

The websites 404A-404n are communicatively coupled to the storage device 408 and a mobile media transcoding interface 412. The mobile media transcoding interface 412 forms part of a mobile media transcoding infrastructure 410, as shown in FIG. 4. The mobile media transcoding infrastructure 410 may be implemented in hardware and software; for example, the mobile media transcoding infrastructure 410 may be implemented as one or more high-speed computer processing devices, such as one or more mainframe computers capable of handling a high volume of computing activities conducted by end users (e.g., mobile devices 402) of the cloud computing network, and one or more of the computer processing devices of the mobile media transcoding infrastructure 410 executes the scaling logic 70 (FIG. 3), which corresponds to a scaling quality manager module 418 (also referred to as "scaling module"), a threshold comparator 422, and scanning module 416 (FIG. 4) to implement the exemplary image conversion and scaling services described herein.

The mobile media transcoding interface 412 is communicatively coupled to an image conversion and scaling service 414, which in turn includes the scanning module 416, the scaling module 418, the threshold comparator 422, and a storage device 420. The storage device 420 stores images including scanned and scaled images, along with text and scaled text, as will be described further herein. In an embodiment, the storage device 420 may also store previously scaled images for re-use, e.g., when a mobile devices 402 requests a web page in which an image has already been successfully scaled for that type of device (e.g., based on known device capabilities).

In one embodiment, in response to a request from a mobile device 402 for a web page, the website 404 accesses the storage device 408 to determine the requesting device's 402 capabilities. This determination seeks to identify whether the mobile device 402 has the required capabilities to view the requested web page. For example, due to reduced screen sizes of a portable communication device, a requested web page may need to be modified (e.g., image sizes reduced) in order to fit the screen size of the mobile device 402. However, this modification may cause text in the image to be illegible to the end user. In an exemplary embodiment, the image conversion and scaling services analyze images from these requested web pages and determine an appropriate scaling factor for rendering the images.

The mobile media transcoding interface 412 receives the images from web pages that are determined to be candidates for scaling based on the capabilities information derived from the storage device 408.

Figure 5:
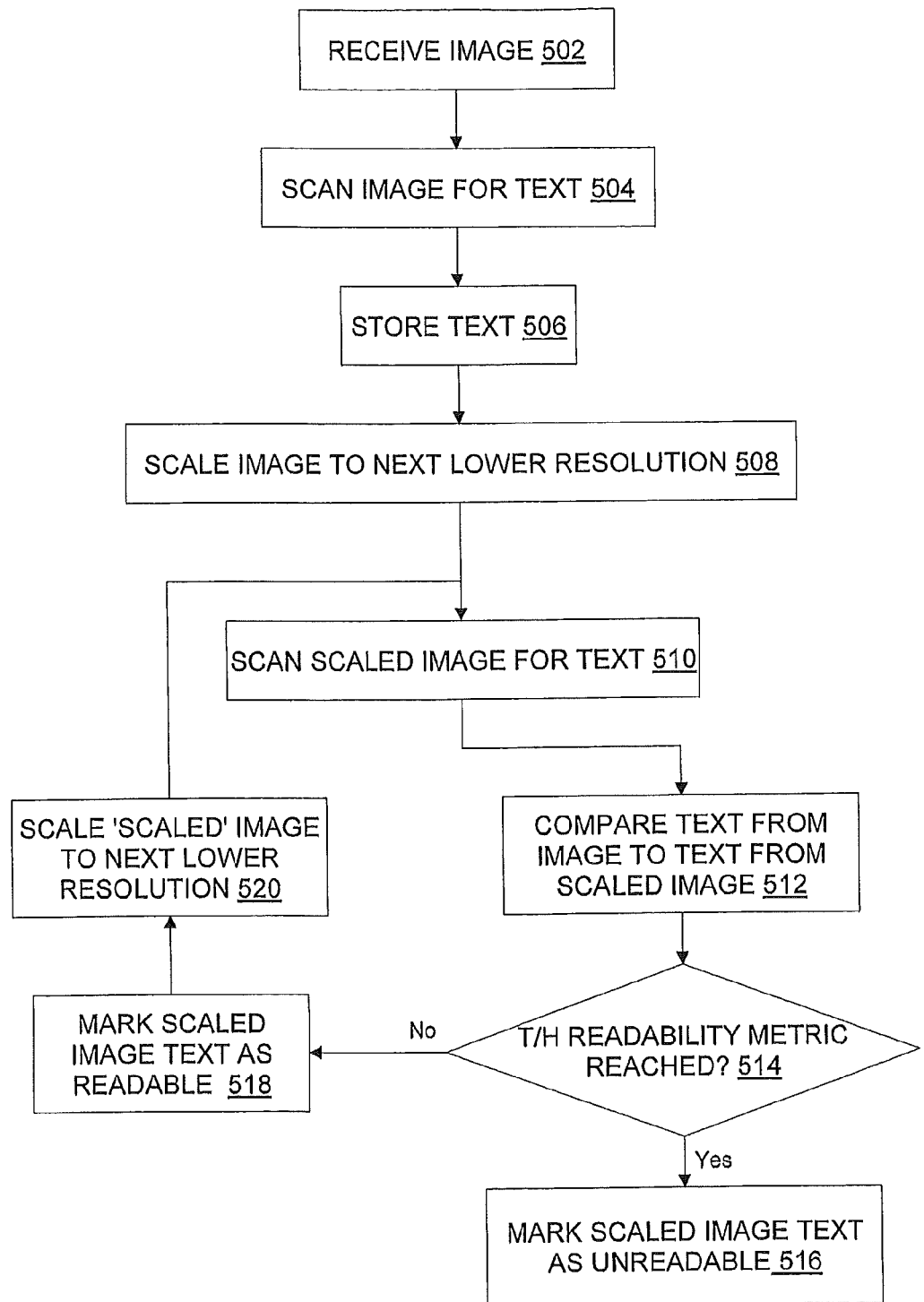
FIG. 5 depicts a flow diagram of a process for providing scaling services according to an embodiment of the present invention.

Turning now to FIG. 5, a process for implementing the image conversion and scaling services will now be described in an exemplary embodiment. The processes described in FIG. 5 refer to a scaling process and assume that a candidate for image scaling has been identified based on a requesting device's capabilities (i.e., the requesting mobile device is determined to have some identified constraints in its ability to receive or view requested digital content) and submitted to the mobile transcoding interface 412 and to the image conversion and scaling service 414.

At step 502, the image conversion and scaling service 414 receives the candidate image (image file). The scanning module 416 scans the image file to identify any text that may be provided therein at step 504. For example, the image file may include a caption or other text information relating to the image. The scanning module 416 may be implemented using any character recognition tool, such as one that utilizes optical character recognition (OCR) technology. The scanned text of the image, along with the image itself is stored in storage device 420 at step 506.

At step 508, the scaling module 418 scales or reduces the size of the image to a next lower resolution than the current resolution of the image. The scaling may be performed using any type of image reduction technique. Scaling an image to a next lower resolution may include reducing a set of pixel dimensions of the image to a next (and nearest) lower rendering level.

At step 510, the scanning module 416 scans the scaled image (i.e., the originally scaled image from step 508 or the most recently scaled image resulting from the scaling process when step 510 is accessed through a loop). The text from the scaled, scanned image is stored in the storage device 420. At step 512, the threshold comparator 422 accesses the storage device 420 and compares the stored text of the original scanned image (from step 504) with the text scaled and scanned in step 510.

At step 514, the threshold comparator 422 determines if a threshold value of a readability metric has been reached. The readability metric is a measure of how closely the scaled text resembles the original text (i.e., the text prior to any scaling process). The greater the readability metric value, the more closely the scaled text matches the original text. This readability metric (and the threshold value) for the readability metric may be defined and implemented in a variety of different ways. One process for determining and implementing the readability metric is described further in FIG. 6.

If the threshold value of the readability metric has been reached at step 514, the text of the scaled image is marked as unreadable at step 516. This means that the scaled text is unsuitable for rendering to the mobile device 402. In this instance, the image conversion and scaling service 414 may select the image having the lowest resolution in which the threshold value of the readability metric was not yet reached, and provide this image to the mobile media transcoding interface 412 for transmission to the requesting website 404 for rendering to the mobile device 402.

Returning to step 514, if the threshold value of the readability metric has not been reached, the scaled image is marked as readable at step 518. This means that the scaled text is considered to be suitable for rendering on the mobile device; however, it may not be at the lowest possible resolution that is acceptable for rendering on the mobile device. In this instance, the scaling module 418 further scales this 'scaled' image to the next lower resolution at step 520. The process returns to step 510, and the steps 510, 512, 514, 518, and 520 are iteratively performed to determine the lowest acceptable resolution (i.e., the steps are iteratively performed until the lowest resolution is found where text is readable for a given mobile device).

Figure 6:
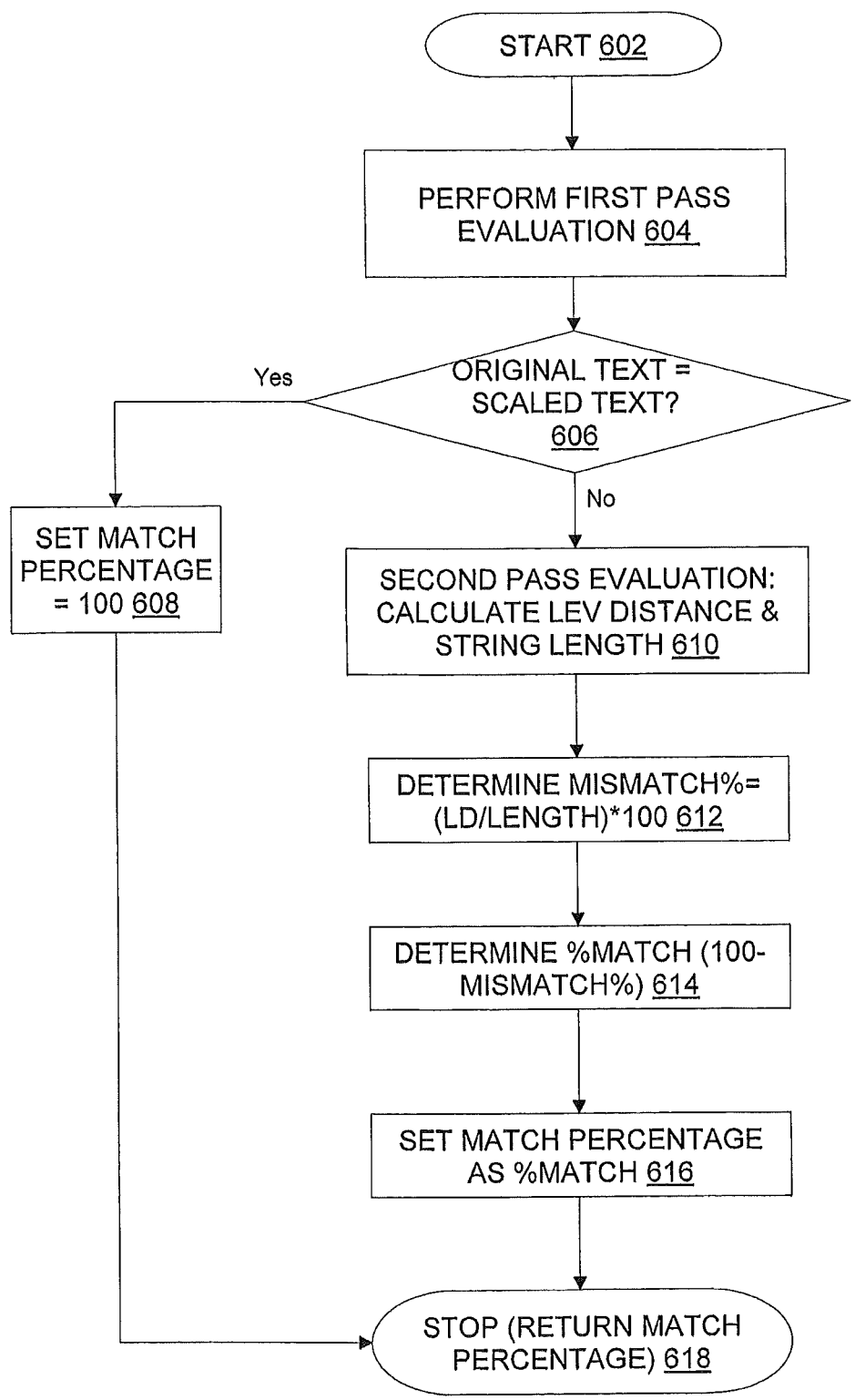
FIG. 6 flow diagram of a process for providing scaling services according to an embodiment of the present invention.

Turning now to FIG. 6, a process for implementing the readability metric will now be described in an embodiment. The threshold value of the readability metric indicates a percentage of the maximum possible readability value in which the resolution of a scaled image text is no longer deemed acceptable or suitable for rendering on a mobile device. The maximum possible readability value refers to a 100% match between the original text and the scaled text. The threshold value may be a user-defined value (e.g., 80% of the maximum possible readability value).

The process begins at step 602, and a first pass evaluation is performed at step 604. The first pass evaluation includes evaluating a text string of the scanned text from the original image to a text string of the scanned text from the scaled image. The evaluation may include assessing the two strings to determine if they are identical. At step 606, if the two strings are identical, the threshold comparator 422 sets a value MATCH PERCENTAGE=100 at step 608 reflecting that the two text strings are identical. The MATCH PERCENTAGE represents a measurement indicative of how closely the two strings resemble each other.

Otherwise, if the two text strings are not identical, a second pass evaluation is performed at step 610. The second pass evaluation seeks to determine how far away the two text strings are from being an identical match. The second pass evaluation may include calculating a Levenshtein Distance between the two text strings, and also determining the length of the original text string (e.g., the number of characters of the text string). The Levenshtein Distance compares the original text string with the scaled text string and determines the number of changes that would need to be made to the scaled text string in order to render the scaled text string equal to the original text string. For example, assume the original text string is "MOTORCYCLE" and the scaled text string is "MOTORCYCIE." The number of changes to be made is "1" (replacing the 'I' with an 'L'). The length of the original text is '10.'

A MISMATCH% value is then determined by the threshold comparator 422 at step 612. The MISMATCH% value represents a measurement indicative of an amount to which the scaled text differs from the original text. The MISMATCH% value may be determined by dividing the Levenshtein Distance value by the text length and multiplying the result by 100. Thus, using the example above, the equation would be 1/10*100, which results in a MISMATCH% of 10.

At step 614, the threshold comparator 422 uses the MISMATCH$% to determine a %MATCH value. The %MATCH value may be determined by subtracting the MISMATCH% from 100, or 100−MISMATCH%=%MATCH. Using the above example, 100−10=%MATCH=90%. The threshold comparator 422 sets the MATCH PERCENTAGE value as 90% for this evaluation at step 616.

The process ends at step 618, whereby the MATCH PERCENTAGE value is returned to the image conversion and scaling service 414. By way of illustration, if the threshold value of the readability metric is set at 80%, then this MATCH PERCENTAGE of 90% in the example above indicates that the scaled text is readable.

Technical effects include an image conversion and scaling service, which provides the ability to evaluate digital media for requested content and determine a scalability factor for reducing the size of the digital content to a level that maintains readability of any embedded text. The image conversion and scaling service employs scanning and scaling components to incrementally reduce text within the digital media and compare the reduced text with the original digital media to determine a readability metric.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A system, comprising:
a computer processor; and
logic executable by the computer processor, the logic configured to implement a method, the method including:
determining an image as a candidate for a scaling process;
scanning the image and identifying text in the image from the scanning;
scaling the image to a next lower resolution, the scaling comprising reducing a set of pixel dimensions to a nearest lower rendering level;
iteratively performing the scaling process until a threshold value of a readability metric is reached, the scaling process including:
scanning the scaled image for scaled text;
comparing a difference between the text and the scaled text to the difference indicative of the readability metric; and
scaling the scaled image to a next lower resolution; and
responsive to reaching the threshold value of the readability metric, selecting from scaled images an image having a lowest resolution resulting from the scaling process before the threshold value of the readability metric was reached;
wherein the readability metric is calculated as a function of a Levenshtein Distance between the text and the scaled text, and a length of the original text.

2. The system of claim 1, wherein the image is determined as a candidate based on capabilities identified for an end user device requesting a web page in which the image is presented.

3. The system of claim 1, wherein the identifying text is implemented using optical character recognition.

4. The system of claim 1, wherein the readability metric is a configurable, user-defined value.

* * * * *